(12) United States Patent
Wakita et al.

(10) Patent No.: US 6,579,347 B1
(45) Date of Patent: Jun. 17, 2003

(54) METHOD FOR REMOVING SULFUR COMPOUND PRESENT IN CITY GAS

(75) Inventors: Hidenobu Wakita, Kyoto (JP); Yukiyoshi Ono, Osaka (JP); Yuko Tachibana, Osaka (JP); Masato Hosaka, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/635,958

(22) Filed: Aug. 10, 2000

Related U.S. Application Data

(63) Continuation-in-part of application No. 09/300,329, filed on Apr. 27, 1999, now abandoned.

(51) Int. Cl.⁷ .............................................. B01D 53/04
(52) U.S. Cl. ........................... 95/135; 95/141; 95/148; 95/902
(58) Field of Search .................... 95/135–137, 141, 95/143, 148, 902; 423/244.11, 245.1

(56) References Cited

U.S. PATENT DOCUMENTS

| | | | | |
|---|---|---|---|---|
| 3,078,641 A | * | 2/1963 | Milton ........................ | 95/136 |
| 3,660,967 A | * | 5/1972 | Collins et al. ................ | 95/137 |
| 3,864,452 A | * | 2/1975 | Chi et al. .................. | 95/136 X |
| 4,012,206 A | * | 3/1977 | Macriss et al. ............ | 95/137 X |
| 4,358,297 A | * | 11/1982 | Eberly, Jr. .................... | 95/136 |
| 4,557,921 A | * | 12/1985 | Kirsch et al. .............. | 95/137 X |
| 4,795,482 A | * | 1/1989 | Gioffre et al. ................. | 95/141 |
| 4,830,734 A | * | 5/1989 | Nagji et al. ................ | 95/135 X |
| 4,865,826 A | * | 9/1989 | Carnell et al. ............. | 95/135 X |
| 4,976,944 A | * | 12/1990 | Pacaud et al. ............. | 95/141 X |
| 5,132,020 A | * | 7/1992 | Sorensen ................... | 95/141 X |
| 5,146,039 A | * | 9/1992 | Wildt et al. ................. | 95/141 X |
| 5,264,193 A | * | 11/1993 | Corcoran, Jr. et al. ..... | 95/135 X |
| 5,269,140 A | * | 12/1993 | Take et al. ................. | 95/141 X |
| 5,271,914 A | * | 12/1993 | Sugimoto et al. .............. | 95/141 |
| 5,557,030 A | * | 9/1996 | Markovs et al. ........... | 95/141 X |
| 5,609,842 A | * | 3/1997 | Tsybulevski et al. ...... | 95/136 X |
| 5,803,953 A | * | 9/1998 | Rojey et al. ............... | 95/136 X |
| 5,858,068 A | * | 1/1999 | Lansbarkis et al. ........ | 95/136 X |

FOREIGN PATENT DOCUMENTS

| | | | | |
|---|---|---|---|---|
| DE | 2556388 A | * | 6/1976 | ................... 95/137 |
| DE | 0219952 A | * | 3/1985 | ................... 95/136 |
| DE | 0241197 A | * | 12/1986 | ................... 95/136 |
| DE | 0241202 A | * | 12/1986 | ................... 95/136 |
| DE | 0296001 A | * | 11/1991 | ................... 95/136 |
| EP | 0159056 A | * | 10/1985 | ................... 95/136 |
| EP | 0284850 A | * | 10/1988 | ................... 95/136 |
| JP | 01-034945 A | * | 2/1989 | ................... 95/141 |
| JP | 01-051314 A | * | 2/1989 | ................... 95/137 |
| SU | 0664675 A | * | 5/1979 | ................... 95/136 |
| SU | 0912234 A | * | 3/1982 | ................... 95/135 |
| SU | 1530227 A | * | 12/1989 | ................... 95/137 |

* cited by examiner

*Primary Examiner*—Robert H. Spitzer
(74) *Attorney, Agent, or Firm*—RatnerPrestia

(57) ABSTRACT

The present invention, relating to a method for removing dimethyl sulfide and tertiary butyl mercaptan present in city gas as the odorants, is aimed at removal of the sulfur compounds from city gas. The present invention removes dimethyl sulfide and tertiary butyl mercaptan in city gas in the presence of a sulfur compound adsorbent containing one of faujasite, β, L and MFI type zeolite. The adsorbent, being composed of zeolite and an inorganic binder, can be regenerated under heating.

17 Claims, No Drawings

METHOD FOR REMOVING SULFUR COMPOUND PRESENT IN CITY GAS

This application is a Continuation-In-Part of U.S. patent application Ser. No. 09/300,329, filed Apr. 27, 1999, now abandoned.

BACKGROUND OF THE INVENTION

1. Field of the Invention

This invention relates to a method for removing dimethyl sulfide (DMS) and tertiary butyl mercaptan (TBM) as the sulfur compounds present in city gas.

2. Related Art of the Invention

The sulfur compounds must be removed from the city gas before it is purged into the air, while a city gas system is under construction or repair. The city gas as the fuel for fuel cells must be desulfurized, to prevent the deactivation of steam reforming catalysts, such as those on Ru and Ni.

Activated carbon, either as it is or modified by some reagent, has been mainly used for removal of the sulfur compounds from the fuel gas.

Desulfurization under consideration for the city gas as the fuel for fuel cells involves hydrodesulfurization of the sulfur compounds into hydrogen sulfide, which is then removed by zinc oxide.

Removal of the sulfur compounds in air for deodorization is generally effected by oxidative decomposition of mercaptan compounds at room temperature in the presence of an oxide of transition metal, e.g., copper or manganese, or by adsorption of these compounds on activated carbon, either as it is or supported.

Each of the above conventional techniques has its own disadvantages.

Activated carbon is difficult to regenerate, because of its combustibility, and must be replaced when sufficiently deactivated. When modified by some reagent, it removes sulfur compounds by chemical reaction, which makes it difficult to regenerate, although showing excellent adsorption-related characteristics (the first problem).

A combination of hydrodesulfurization pretreatment and removal of $H_2S$ in the presence of zinc oxide for fuel cell fuels needs high temperature of 300 to 400° C. for the hydrodesulfurization process, which lowers overall efficiency of the power output by the cell. It is also necessary to replace deactivated zinc oxide (the second problem).

The deodorization in an oxidative atmosphere in the presence of an oxide of transition metal, e.g., copper or manganese, mercaptan compounds may be partially oxidized at room temperature into a disulfide, which will cause offensive odor, and is difficult to remove the sulfur compounds, e.g., sulfides, other than mercaptan compounds (the third problem).

SUMMARY OF THE INVENTION

In consideration of the above first and second problems involved in the conventional techniques for removing the sulfur compounds, it is an object of the present invention to provide a method for removing dimethyl sulfide (DMS) and/or tertiary butyl mercaptan (TBM) as the sulfur compounds present in city gas. It is another object of the present invention to provide a method for removing the sulfur compounds by the aid of the above adsorbent.

The present invention provides a method for removing dimethyl sulfide (DMS) and/or tertiary butyl mercaptan (TBM) as the sulfur compounds present in city gas by using the sulfur compounds adsorbent containing one of faujasite, β, L and MFI type zeolite, and also provides a method for removing the sulfur compounds, in which the above adsorbent is intermittently regenerated.

One aspect of the present invention is a method for removing dimethyl sulfide (DMS) and/or tertiary butyl mercaptan (TBM) as sulfur compounds present in city gas by using a sulfur compound adsorbent containing one of faujasite, β, L and MFI type zeolite.

Another aspect of the present invention is a method for removing sulfur compounds, wherein said zeolite comprises Si and another type of metal M in the framework, Si/M atomic ratio being 250 or less and M being selected from the group consisting of Al, Fe and Ga.

Still another aspect of the present invention is a method for removing sulfur compounds, wherein the cation in said zeolite is $H^+$.

Yet another aspect of the present invention is a method for removing sulfur compounds, wherein said zeolite is treated for dealuminization.

Still yet another aspect of the present invention is a method for removing sulfur compounds, wherein said sulfur compound adsorbent contains an inorganic binder.

A further aspect of the present invention is a method for removing sulfur compounds, wherein said inorganic binder is silica.

A still another aspect of the present invention is a method for regenerating an adsorbent for sulfur compounds, containing one of faujasite, β, L and MFI type zeolite and an inorganic binder, wherein at least heating step is included for regenerating said adsorbent after said adsorbent is used for a process which removes dimethyl sulfide (DMS) and/or tertiary butyl mercaptan (TBM) as the sulfur compounds present in city gas.

Yet another aspect of the present invention is the method for regenerating an adsorbent for sulfur compounds, wherein a gas released from said adsorbent during said regeneration process is oxidized in the presence of an oxidation catalyst.

Yet another aspect of the present invention is a method for removing sulfur compounds, comprising a first step which passes city gas which contains dimethyl sulfide (DMS) and/or tertiary butyl mercaptan (TBM) as the sulfur compounds over a first adsorbent containing ultrastable Y type zeolite, and second step which passes the gas from the first step over a second adsorbent containing MFI or faujasite type zeolite having an alkaline or alkaline-earth metal in the cation site.

Yet another aspect of the present invention is a method for removing sulfur compounds, comprising:

a first step of passing a mercaptan-containing city gas over a first adsorbent containing zeolite with $H^+$ as the cation or dealuminized zeolite; and a second step of passing the gas from the first adsorbent over a second adsorbent containing zeolite having an alkaline or alkaline-earth metal in the ion-exchanged site.

THE PREFERRED EMBODIMENTS OF THE INVENTION

City gas is intentionally incorporated with trace quantities of a sulfur compound as the odorant in order to give a warning of gas leak. The odorant type differs by city gas supplier. In Japan, tertiary butyl mercapatan (TBM), dimethyl sulfide (DMS) or tetrahydrothiophene is added to city gas to several ppm. Unlike natural gas or coke oven gas which contains various types of sulfur compounds, the city gas is intentionally incorporated with the sulfur compound of known structure at a known concentration. Therefore, the sulfur compound in the city gas can be removed by adsorption, when an adequate adsorbent is selected to efficiently adsorb the compound.

The present invention removes the sulfur compounds by the aid of an adsorbent which contains one of faujasite (X or Y type), β, L and MFI type zeolite. It is composed of inorganic materials, and can be regenerated under heating.

Tertiary butyl mercaptan and dimethyl sulfide are the typical odorants used for the city gas, the latter being more difficult to remove by adsorption and showing an earlier break-through. It is therefore important to increase amount of dimethyl sulfide adsorbed. Use of faujasite, β, L or MFI type zeolite can increase the adsorbed quantity from that adsorbed by other types of zeolite, such as A type.

The present invention needs no heating for adsorption, because adsorbed amount increases as temperature decreases, and is more advantageous over the method involving hydrodesulfurization, because of simplified equipment designs and saved energy.

The adsorbent of the present invention comprises Si and another type of metal M in the skeleton structure. Zeolite having an Si/M molar ratio of 250 or less shows excellent adsorption characteristics, which tend to improve as Si/M ratio decreases. It is known that zeolite of low Si/M molar ratio is generally high in acidity. The inventors of the present invention have investigated zeolite acidity by the temperature-programmed desorption method of ammonia (ammonia TPD), to find that zeolite of low Si/M molar ratio shows a larger quantity of ammonia desorbed, or higher in acidity, indicating that acidity of zeolite contributes to removal of a sulfur compound present in fuel gas. It is preferable that an element M that comprises, together with Si, the zeolite framework for the present invention is Al, Fe or Ga. This combination gives higher characteristics of removing sulfur compounds than any other combination.

The zeolite contains an ion-exchangeable cation, and shows excellent characteristics for removing the sulfur compound from fuel gas, when the cation is $H^+$, conceivably by virtue of increased number of strong acid sites. It is therefore considered that zeolite having strong acid sites adsorbs sulfur compounds well.

It is preferable that the zeolite for the present invention is treated for dealuminization, which is considered to increase the number of strong acid sites. Any known dealuminization method can be used for the present invention, including hydrothermal treatment, heating in an acidic solution, or heating in a gaseous atmosphere containing a silicon compound, e.g., silicon tetrachloride.

TBM breaks through in a relatively short time in the absence of DBM, when passed over zeolite containing $H^+$ as the cation or dealuminized zeolite. However, the period before it breaks through will be extended in the presence of DMS. TBM turns into an isobutene-like species when adsorbed on the acid site, and it is considered that polymerization of the isobutene-like species is prevented in the presence of DMS to control poisoning of the acid sites as the active sites.

It is preferable that the adsorbent of the present invention is in the form of pellet or the like, and that the binder is inorganic. Use of an organic binder, such as a cellulosic one, may deteriorate adsorbent strength, because of its possible combustion during the regeneration under heating. This problem can be avoided when the adsorbent is regenerated at a temperature level below the combustion point of the organic binder in question. However, this tends to greatly limit the working temperature range, knowing that a cellulosic compound starts to decrease in strength at 160° C. or more, and the regeneration is frequently insufficient, because of a temperature distribution within the adsorbent bed during the regeneration under heating. The inorganic binders useful for the present invention include fired colloids, e.g., silica, alumina and titania sol; clay-based compounds; and cement and gypsum. Of these, more preferable one is silica, dehydrated by firing silica sol. Fired alumina sol, clay-based compounds and alumina cement may show a lower strength, whereas Li silicate and water glass, although giving a high form strength, will show lower adsorption characteristics. Use of silica as the inorganic binder gives a strong form without sacrificing its adsorption characteristics.

It is preferable that the adsorbent of a related invention of the present invention contains copper oxide, manganese oxide, a compound oxide of copper and manganese, or platinum group element. Each of these compounds or element has activity of partially oxidizing a mercaptan compound, and hence can greatly improve characteristics of the adsorbent for removing a mercaptan compound in the presence of oxygen. This related invention of the present invention can solve the above mentioned third problem. A platinum group element can exhibit the above characteristics sufficiently in only a small quantity, when finely dispersed in a porous carrier, such as alumina. A disulfide will be formed as the partial oxidation product in the presence of the above compound or element, but release of the sulfur compound can be well controlled by selecting a zeolite of high disulfide adsorption capacity.

Furthermore, it is preferable to regenerate the deactivated adsorbent of the present invention, which allows to use the adsorbent for extended periods. The adsorbent can be regenerated by various methods, such as passing a sulfur-free gas over the adsorbent, heating the adsorbent, and treating the adsorbent under a vacuum. The method involving at least heating is preferable, because it completes the regeneration faster.

Furthermore, it is preferable to oxidize, in the presence of an oxidation catalyst, the gas released out of the adsorbent during the regeneration process. This is to facilitate the post-treatment step, e.g., absorption of the sulfur compound by an alkaline aqueous solution, by converting it into sulfur dioxide as an acidic gas. This prevents release of odorous sulfur dioxide and also protects the equipment from corrosion, although periodic exchange of the treatment solution is required.

It is preferable that the oxidation catalyst for the present invention contains platinum, which is more resistant to poisoning by sulfur than other precious elements, e.g., palladium and rhodium, and sustains oxidation activity for more extended periods.

Ultrastable Y type (USY) is one of the most active zeolite types for removing an odorant from city gas. However, USY needs a long time before the stable adsorption band is formed in the adsorbent layer, tending to show declined DMS adsorption characteristics in a short time after starting adsorption and then high adsorption characteristics thereafter. Tendency of having strong acid sites is considered to be responsible for such behavior of USY.

By contrast, faujasite (Y or X) type zeolite having an alkaline or alkaline-earth element in the ion-exchanging site, although showing high adsorption characteristics during the initial stage, adsorbs smaller quantities of sulfur compounds, rapidly losing its adsorption ability when the break-through starts, increasing sulfur content of the gas which has passed over it. MFI type zeolite, on the other hand, has high DMS adsorption capacity but lower TBM adsorption capacity than USY.

The present invention provides a method for removing sulfur compounds from fuel gas, comprising a first step which passes a sulfur-containing fuel gas over a first adsorbent containing ultrastable Y (USY) type zeolite, and second step which passes the gas from the first step over a second adsorbent containing MFI or faujasite type zeolite having an alkaline or alkaline-earth metal in the ion-exchanging site. During the initial stage of the adsorption process before the first adsorbent exhibits high adsorption characteristics, the sulfur compound breaking through the first step is mainly removed by the second step downstream of the first step by the second adsorbent, which contains MFI type zeolite capable of adsorbing DMS difficult to remove by the first adsorbent, or faujasite zeolite having an alkaline or alkaline-earth element in the ion-exchanging site, showing high adsorption characteristics from the very start of the adsorption process. A combination of these steps secures high desulfurization capacity as a whole for extended periods, because of stabilized adsorption capacity of the first adsorbent in a certain time after start of the adsorption process, although the second adsorbent adsorbs smaller quantities of sulfur compounds than USY, as described above.

Characteristics of zeolite for removing sulfur compounds depend on its acidity. However, when fuel gas is passed over zeolite having strong acidic sites for extended periods, trace quantities of hydrogen sulfide may be detected in the exhaust gas, depending on sulfur compound type present in the feed gas. This problem can be solved, when zeolite having a high acidity is followed by an adsorbent having a high capacity of adsorbing hydrogen sulfide if high desulfurization capacity is required. Adsorbent of high $H_2S$ adsorption capacity include faujasite type zeolite with an alkaline metal as the cation.

EXAMPLES

The present invention is described concretely by Examples.

Example 1

Characteristics of adsorbing dimethyl sulfide were investigated for a variety of adsorbents. The adsorbents tested were copper oxide; manganese dioxide; 30 wt. %CuO-70 wt. %$MnO_2$ prepared by pyrolysis of a mixed aqueous solution of copper nitrate and manganese nitrate; 1 wt. %Pt/$Al_2O_3$ prepared from an aqueous solution of chloroplatinic acid and γ-alumina by impregnation; Na—A type zeolite; K—L type zeolite ($SiO_2/Al_2O_3$ molar ratio: 6.2; Si/Al molar ratio: 3.1); H-β type zeolite ($SiO_2/Al_2O_3$ molar ratio: 20; Si/Al molar ratio: 10); Na—Y type zeolite ($SiO_2/Al_2O_3$ molar ratio: 5.7; Si/Al molar ratio: 2.9); 13X ($SiO_2/Al_2O_3$ molar ratio: 2.5; Si/Al molar ratio: 1.3); H-ZSM-5 ($SiO_2/$molar ratio: 50; Si/Al molar ratio: 25); ferrierite ($SiO_2/Al_2O_3$ molar ratio: 18; Si/Al molar ratio: 9.0); and erionite ($SiO_2/Al_2O_3$ molar ratio: 6; Si/Al molar ratio: 3). In order to investigate functions of an alkali metal salt, alkaline-earth metal oxide and rare-earth metal oxide, potassium carbonate, magnesium oxide and cerium oxide were also tested. All of the adsorbents tested were powdery. An adsorption test unit was a flow system operating at atmospheric pressure, equipped with a sample tube (inner diameter: 4 mm) in which 5 mg of the adsorbent sample was packed. The sulfur compound removal test was conducted, after pretreatment at 120° C. for 30 min, by passing $N_2$ gas containing 6 ppm of dimethyl sulfide over the adsorbent in the sample tube at 400 ml/min, until the sulfur concentration of the gas at the outlet increased to that at the inlet, where the concentration was determined by gas chromatography with FPD as the detector. The tube was put in a constant-temperature bath to keep adsorption temperature at 25° C.

The results are given in Table 1, which shows a saturated adsorption per unit mass of each adsorbent.

TABLE 1

| Samples | Saturated amount adsorption of dimethyl sulfide (g/g) |
|---|---|
| Copper oxide | 0.003 |
| Manganese dioxide | 0.004 |
| Compound oxide of copper and manganese | 0.003 |
| Pt/$Al_2O_3$ | 0.005 |
| Na-A type zeolite | 0.021 |
| K-L type zeolite | 0.052 |
| H-β type zeolite | 0.040 |
| Na-Y type zeolite | 0.092 |
| 13X | 0.069 |
| H-ZSM-5 | 0.022 |
| Ferrierite | 0.018 |
| Erionite | 0.020 |
| Potassium carbonate | 0.003 |
| Magnesium oxide | 0.004 |
| Cerium oxide | 0.003 |

As shown in Table 1, dimethyl sulfide can be efficiently adsorbed by zeolite, in particular faujasite (e.g., Na—Y and 13X), β and L types.

Example 2

Characteristics of adsorbing odorants for city gas were investigated for a variety of adsorbents. The same adsorbents as used for Example 1 were tested, i.e., copper oxide; manganese dioxide; 30 wt. %CuO-70 wt. %$MnO_2$, 1 wt %Pt/$Al_2O_3$, Na—A type zeolite, K—L type zeolite, H-β type zeolite, Na—Y type zeolite, 13X, H-ZSM-5, ferrierite, and erionite. In order to investigate functions of an alkali metal salt, alkaline-earth metal oxide and rare-earth metal oxide, potassium carbonate, magnesium oxide and cerium oxide were also tested. All of the adsorbents tested were press-molded and crushed into 2.0 to 3.3 mm pieces. City gas (13A) was passed over 1.8 g of the adsorbent packed in a sample tube (inner diameter: 17 mm) at 0.13 m/s. Characteristics of each adsorbent were determined by gas chromatography with FPD as the detector. The pretreatment was effected at 500° C. for 1 h in a flow of nitrogen, and adsorption was carried out at room temperature. Two types of odorants were used, dimethyl sulfide and tertiary butyl mercaptan, both contained in the city gas at 2.4 ppm. Adsorption of the odorant was greatly different by adsorbent type. The tested adsorbents fall into two general categories, one showing excellent adsorption characteristics in 2 to 4 h after start of the test but rapidly increasing odorant concentration at the outlet thereafter, and the other showing essentially constant adsorption for first 10 h. The results are given in Table 2, which shows an odorant removal rate for each odorant and adsorbent 9 h after start of the test.

TABLE 2

| Samples | Removal rate of DMS 9 h after start of the test (%) | Removal rate of TBM 9 h after start of the test (%) |
|---|---|---|
| Copper oxide | 0 | 0 |
| Manganese dioxide | 0 | 0 |
| Compound oxide of copper and manganese | 0 | 0 |
| $Pt/Al_2O_3$ | 0 | 0 |
| Na-A type zeolite | 0 | 0 |
| K-L type zeolite | 8 | 30 |
| H-β type zeolite | 63 | 60 |
| Na-Y type zeolite | 0 | 25 |
| 13X | 0 | 0 |
| H-ZSM-5 | 47 | 34 |
| Ferrierite | 0 | 0 |
| Erionite | 0 | 0 |
| Potassium carbonate | 0 | 0 |
| Magnesium oxide | 0 | 0 |
| Cerium oxide | 0 | 0 |

As shown in Table 2, H-β type zeolite and H-ZSM-5 exhibit particularly good characteristics for removal of the odorant from city gas, and MFI type zeolite, relatively inefficient in removal of DMS (Example 1), exhibits good characteristics in the odorant removal tests.

Example 3

In order to investigate the effects of ratio of the elements that constituted the crystal framework structure, the following tests were conducted. The MFI type zeolite samples, whose frameworks were composed of Si and Al of varying molar ratio, were synthesized under hydrothermal conditions, where the Si/Al molar ratios were set at 25, 50, 200, 250 and 270. All of these zeolite samples were of H type. The tests for removal of odorants from city gas were conducted in a manner similar to that for Example 2. The results are given in Table 3.

TABLE 3

| Si/Al molar ratio | Removal rate of DMS 9 h after start of the test (%) | Removal rate of TBM 9 h after start of the test (%) |
|---|---|---|
| 25 | 55 | 48 |
| 50 | 47 | 34 |
| 200 | 10 | 5 |
| 250 | 7 | 4 |
| 270 | 0 | 0 |

As shown in Table 3, the odorant can be efficiently removed from city gas by an adsorbent of MFI type zeolite having an Si/Al molar ratio of 250 or less.

Example 4

In order to investigate the effects of elemental species that constituted the zeolite crystal frameworks, the following tests were conducted. The zeolite samples were synthesized using Fe, Ga, Mn or V in place of Al for the samples prepared by Example 3, where Si/M molar ratio of a metal species M was set at 25. All of these zeolite samples were of H type. The tests for removal of odorants from city gas were conducted in a manner similar to that for Example 2. The results are given in Table 4.

TABLE 4

| Metal species | Removal rate of DMS 9 h after start of the test (%) | Removal rate of TBM 9 h after start of the test (%) |
|---|---|---|
| Al | 55 | 48 |
| Fe | 54 | 52 |
| Ga | 49 | 38 |
| Mn | 0 | 34 |
| V | 2 | 28 |

As shown in Table 4, it is preferable that an element M that comprises an MFI zeolite framework is Al, Fe or Ga in combination with Si.

Example 5

In order to investigate the effects of cation type contained in zeolite, the following tests were conducted. The cation in the zeolite having an Si/Al molar ratio of 50, prepared by Example 3, was ion-exchanged by $Na^+$, $K^+$ or $Cu^{2+}$, and the tests for removal of odorants from city gas were conducted in a manner similar to that for Example 2. The results are given in Table 5.

TABLE 5

| Cation | Removal rate of DMS 9 h after start of the test (%) | Removal rate of TBM 9 h after start of the test (%) |
|---|---|---|
| $H^+$ | 47 | 34 |
| $Na^+$ | 7 | 8 |
| $K^+$ | 6 | 4 |
| $Cu^{2+}$ | 5 | 20 |

As shown in Table 5, the zeolite sample with $H^+$ as the cation exhibits better characteristics for removing sulfur compounds from city gas than the others.

Example 6

In order to investigate the effects of dealuminization as the zeolite pretreatment step, the following tests were conducted. H—Y type zeolite (Si/Al molar ratio: 5.5) was heated at 600° C. for 5 h in a flow of steam for dealuminization, to form ultrastable Y type zeolite (USY). The H—Y zeolite and USY were tested for removal of odorants from city gas in a manner similar to that for Example 2. The results are given in Table 6.

TABLE 6

| Samples | Removal rate of DMS 9 h after start of the test (%) | Removal rate of TBM 9 h after start of the test (%) |
|---|---|---|
| H-Y type zeolite | 13 | 42 |
| USY zeolite | 45 | 57 |

As shown in Table 6, the zeolite shows excellent characteristics for removing sulfur compounds from fuel gas, when treated for dealuminization.

Example 7

In order to investigate resistance of the binder to heat, the following tests were conducted.

A mixture of H-ZSM-5 (Si/Al molar ratio: 25), silica sol and water was kneaded to give a final solid composition of 80 wt. %zeolite-20 wt. %silica, which was formed into spheres (diameter: 1 cm) and fired at 500° C. for 1 h. Similarly, a mixture of H-ZSM-5 (Si/Al molar ratio: 25), hydroxyethyl cellulose and water was kneaded to give a final solid composition of 80 wt. %zeolite-20 wt. %hydroxyethyl cellulose, which was formed into spheres and fired at 500° C. for 1 h. Each fired sample was tested for resistance to mechanical shock. The former sample was sufficiently resistant to mechanical shock by the drop test in which it was dropped from a height of 50 cm. On the other hand, the latter sample was broken by a small shock.

Weakness of the latter sample results from combustion of hydroxyethyl cellulose to lose its binding strength, indicating that an inorganic binder is preferable for the present invention.

Example 8

In order to investigate the effects of binder species on strength of the formed zeolite adsorbent and its capacity of removing sulfur compounds, the following tests were conducted. A mixture of H-ZSM-5 (Si/Al molar ratio: 25), silica sol containing 30 wt. % of silica and water was kneaded to give a final solid composition of 80 wt. %zeolite-20 wt. %binder, which was pressed in a cylindrical mold (inner diameter: 20 mm) and fired at 500° C. for 1 h. The coin-shaped sample thus prepared was ground by sand paper to have a thickness of 5 mm for the flexural strength test. In the test, the sample was set horizontally on a cylindrical table (inner diameter: 15 mm) in such a way to align the sample center at the table center, where an iron ball (diameter: 4 mm) was pressed against the sample from the upper part of the center of the sample at 3 mm/min by an electronic, multi-purpose tester, to determine its flexural strength corresponding to a force at which the sample was broken. The coin-shaped samples were also prepared with alumina sol, bentonite, Li silicate, water glass or alumina cement in place of silica sol as the binder component, fired to have 20 wt. % of the solid binder. They were also tested for flexural strength in a similar manner. These coin-shaped samples were broken, and tested for their capacity of removing odorants from city gas in a manner similar to that for Example 2. The results are given in Table 7.

TABLE 7

| Binder | Flexural strength (kgf) | Removal rate of DMS 9 h after start of the test (%) | Removal rate of TBM 9 h after start of the test (%) |
|---|---|---|---|
| Silica sol | 0.52 | 38 | 35 |
| Alumina sol | 0.28 | 40 | 34 |
| Bentonite | 0.37 | 35 | 32 |
| Li silicate | 0.72 | 15 | 15 |
| Water glass | 0.71 | 14 | 13 |
| Alumina cement | 0.33 | 17 | 14 |

As shown in Table 7, the samples with alumina sol, bentonite and alumina cement as the binder components show an insufficient strength, whereas those with Li silicate and water glass show greatly deteriorated adsorption characteristics, although high in strength. Silica as the inorganic binder gives the sample of high strength, without much sacrificing the adsorption characteristics.

Example 9

An example of a preferred embodiment of the related invention of the present invention corresponding to the description on page 10, lines 5 to 21 will be described.

In order to investigate the effects of additive on removal of mercaptan in the presence of oxygen, the following tests were conducted.

A mixture of copper oxide, used for Example 1, H-ZSM-5 (Si/Al molar ratio: 25), silica sol and water was kneaded, and fired at 300° C. for 1 h, to give a final solid composition of 70 wt. %H-ZSM-5-20 wt. %silica-10 wt. %copper oxide. The same procedure was repeated, except copper oxide was replaced by manganese dioxide; 30 wt. %Cuo-70 wt. %$MnO_2$; transition metal oxides prepared by pyrolysis of aqueous solutions of each kind of nitrate of Cr, Co and Ni; 1 wt. %Pt/$Al_2O_3$; 1 wt. %Pd/$Al_2O_3$ prepared from an aqueous solution of palladium nitrate and γ-alumina by impregnation; 1 wt. %Rh/$Al_2O_3$ prepared from an aqueous solution of rhodium nitrate and γ-alumina by impregnation, some of which were used for Example 1. The same procedure was also repeated, except that the above additive was replaced by potassium carbonate, magnesium oxide and cerium oxide, in order to investigate functions of an alkali metal salt, alkaline-earth metal oxide and rare-earth metal oxide. Similarly, a sample of 80 wt. %H-ZSM-5-20 wt. %silica was prepared, for comparison.

These samples were crushed, press-molded and crushed again into pellets, 1 to 2 mm in size. The methyl mercaptan removal test was conducted by a flow type adsorption test unit operating at atmospheric pressure and holding 0.02 g of each sample, over which air containing 10 ppm of methyl mercaptan was passed at 3/min. The changed methyl mercaptan concentration at the outlet was followed by gas chromatography with FPD as the detector. The sample tube holding each sample was put in a constant-temperature bath to keep adsorption temperature at 25° C. The outlet methyl mercaptan concentration increased with time. Amount of methyl mercaptan removed for 1000 min after start of the test was determined for each adsorbent sample. The results are given in Table 8.

TABLE 8

| Additives | Quantity of methyl mercaptan removed (g/g) |
|---|---|
| Copper oxide | 0.07 |
| Manganese dioxide | 0.07 |
| CuO-$MnO_2$ | 0.07 |
| Chromium oxide | 0.01 |
| Cobalt oxide | 0.03 |
| Nickel oxide | 0.02 |
| Pt/$Al_2O_3$ | 0.07 |
| Pd/$Al_2O_3$ | 0.06 |
| Rh/$Al_2O_3$ | 0.05 |
| Potassium carbonate | 0.02 |
| Magnesium oxide | 0.02 |
| Cerium oxide | 0.02 |
| No additive | 0.02 |

As shown in Table 8, the characteristics for removing methyl mercaptan are greatly improved in the presence of oxygen, when the H-ZSM-5/silica composition is incorporated with copper oxide, manganese oxide, a compound oxide of copper and manganese or platinum group element as the additive.

Example 10

The adsorbent regeneration test was conducted, at 500° C. for 5 h, for the H-ZSM-5 adsorbent sample, which was used to adsorb the odorants in city gas for 10 h in Example 2 (the first odorant removal tests), where supply of city gas was stopped 10 h after start of the test, and air was passed at 0.13 m/s through the sample tube in the reverse direction and then the sample was fired at 500° C. for 5 h. The second odorant removal tests were conducted with the regenerated adsorbent in a manner similar to that used for Example 2, except the pretreatment at 500° C. was omitted. Removal ratio of DMS and TBM were 47% and 34%, respectively, 9 h after start of the first tests, and they were essentially the same at 45% and 35% 9 h after start of the second tests. The similar regeneration tests were conducted for the H-β and K—L type zeolite samples (used in Example 2), and H—Y and USY zeolite samples (used in Example 6). All of these samples were found to recover their adsorption characteristics by the regeneration. Therefore, the adsorbent of the present invention can be regenerated by heating.

Example 11

Treatment of sulfur compounds released during the adsorbent regeneration process was investigated by the following method.

A mixture of K—L type zeolite, silica sol and water was kneaded and fired at 300° C. for 1 h, to prepare the adsorbent sample of 80 wt. %K—L zeolite-20 wt. %silica.

This sample was crushed, press-molded and crushed again into pellets, 1 to 2 mm in size. The saturated adsorption of dimethyl sulfide was determined for this sample by the method described in Example 1. Then, air was passed over the sample at 100 ml/min for 15 min, while heating the sample at 10° C./min to 150° C. The gas released during this process was collected by a TEDLAR® bag, and the sulfur compounds in the gas collected by the bag were analyzed by gas chromatography with FPD as the detector. Dimethyl sulfide was detected to be present in the bag at 31 ppm, and a trace quantity (0.1 ppm or less) of $SO_2$ was also detected, indicating that dimethyl sulfide was mostly desorbed directly.

The gas components in the desorbed gas were investigated, after it was treated in the presence of a catalyst, by the following method. The 1 wt. %$Pt/Al_2O_3$ catalyst sample prepared by Example 1 was crushed into pellets, 1 to 2 mm in size, and 0.02 g of the sample was packed in a sample tube, 4 mm in inner diameter. This sample tube was set downstream of the adsorbent while it was regenerated under heating, to treat the desorbed gas released from the adsorbent by the $Pt/Al_2O_3$ catalyst at 500° C. The adsorbent, adsorption/desorption conditions were the same as used for the above method, which used no catalyst to treat the desorbed gas. The gas treated by the Pt catalyst was collected in a TEDLAR® bag. Gas chromatography detected 29 ppm of $SO_2$ but no dimethyl sulfide present in the bag.

Treatment of the gas passing over the Pt catalyst was investigated by the following method. The gas passing over the Pt catalyst was bubbled in 300 ml of 1N aqueous solution of sodium hydroxide held in a wash bottle, to absorb the desorbed gas by the solution. The same adsorbent, adsorption/desorption conditions and catalytic oxidation treatment conditions as the above were used. The gas treated by the sodium hydroxide solution was collected in a TED-LAR® bag. Gas chromatography with FPD as the detector detected no sulfur compound.

As described above, organosulfur compounds can be converted into sulfur dioxide by treating the gas released while the adsorbent for sulfur compound is regenerated with the oxidation catalyst. The sulfur compounds can be absorbed by an alkaline aqueous solution, when converted into sulfur dioxide as an acid gas, to control emission of odorous components and protect the related facilities from corrosion.

Example 12

Characteristics of adsorbing odorants in city gas were investigated for various zeolite adsorbents. The adsorbents tested were ultrastable Y type zeolite (USY, Si/Al molar ratio: 3.1), H-ZSM-5 (Si/Al molar ratio: 25), Na—Y type zeolite (Si/Al molar ratio: 2.9), Ca—X type zeolite (10 X, Si/Al molar ratio: 1.3), H—Y type zeolite (Si/Al molar ratio: 2.3), K—L type zeolite (Si/Al molar ratio: 3.1), and Ca—A type zeolite (Si/Al molar ratio: 1).

The adsorption tests were conducted in a manner similar to that for Example 2. The results are given in Table 9, which shows an odorant removal rate for each odorant and adsorbent 2, 5 and 9 h after start of the test.

TABLE 9

| Samples | Removal rate 2 h after start of the test (%) | | Removal rate 5 h after start of the test (%) | | Removal rate 9 h after start of the test (%) | |
|---|---|---|---|---|---|---|
| | DMS | TBM | DMS | TBM | DMS | TBM |
| USY | 22 | 50 | 35 | 55 | 44 | 58 |
| H-ZSM-5 | 48 | 38 | 44 | 34 | 47 | 34 |
| Na-Y | 44 | 63 | 0 | 40 | 0 | 25 |
| 10X | 43 | 50 | 0 | 20 | 0 | 15 |
| H-Y | 14 | 48 | 15 | 45 | 15 | 43 |
| K-L | 18 | 44 | 10 | 33 | 10 | 30 |
| Ca-A | 10 | 0 | 0 | 0 | 0 | 0 |

The odorant adsorbing characteristics vary widely by adsorbent type. USY shows a moderate odorant removal rate in 2 to 4 h after start of the test, which, however, increased slowly with time, reaching a higher level than those of the other samples tested in 9 h.

On the other hand, H-ZSM-5 is generally lower in TBM adsorbing characteristics than USY, although showing relatively high characteristics from the start of the test. Na—Y and 10X, faujasite type zeolite with an alkaline or alkaline-earth metal in the ion-exchanging site, show excellent characteristics in 2 to 4 h from start of the test, which, however, decline rapidly with time. H—Y and K—L, zeolite with proton as the cation, show low characteristics from start of the test. Ca—A adsorbs no TBM throughout the run, because its pores are too small for TBM to penetrate into.

Each of the above samples was press-molded and crushed into pellets, 2.0 to 3.3 mm in size, and 1.8 g of the sample was packed in a sample tube (inner diameter: 17 mm) to be used as the second adsorbent.

The odorant adsorption tests were conducted in a similar manner for the 2-stage system, with USY as the first adsorbent, prepared and packed in a sample tube in a similar manner, and followed by the second adsorbent. The results are given in Table 10.

TABLE 10

| Adsorbents | Removal rate 2 h after start of the test (%) | | Removal rate 5 h after start of the test (%) | | Removal rate 9 h after start of the test (%) | |
|---|---|---|---|---|---|---|
| B | DMS | TBM | DMS | TBM | DMS | TBM |
| USY | 95 | 98 | 90 | 98 | 84 | 83 |
| H-ZSM-5 | 98 | 95 | 97 | 95 | 97 | 94 |
| Na-Y | 98 | 97 | 97 | 97 | 95 | 95 |
| 10X | 98 | 97 | 98 | 97 | 94 | 94 |
| H-Y | 80 | 97 | 80 | 97 | 75 | 96 |
| K-L | 82 | 97 | 80 | 96 | 77 | 90 |
| Ca-A | 85 | 50 | 84 | 54 | 50 | 54 |

As shown in Table 10, USY as the second adsorbent gives excellent characteristics during the initial stage, which, however, decline in 9 h. With H—Y and K—L as the second adsorbents, DMS removal rate is low throughout the run. Ca—A as the second adsorbent adsorbs no TBM. On the other hand, use of H-ZSM-5 (MFI type zeolite), or Na—Y or Ca—X (faujasite type zeolite with an alkaline or alkaline-earth metal in the cation site) as the second adsorbent gives high adsorption characteristics stably for extended periods.

Examples 13 and 14 of a preferred embodiment of the present invention corresponding to the description on page 13, lines 5 to 16 will be described.

Example 13

Concentration of hydrogen sulfide evolving when an odorant for city gas was adsorbed was measured in each test run for Example 12, the results of which are given in Table 9. Concentration of hydrogen sulfide in the treated city gas increased with time in a run in which evolution of hydrogen sulfide was observed. Concentration of hydrogen sulfide in the treated gas after a lapse of 9 hours is given in Table 11 for each run.

TABLE 11

| Samples | Concentration of hydrogen sulfide After a lapse of 9 hours (ppb) |
|---|---|
| USY | 63 |
| H-ZSM-5 | 42 |
| Na—Y | Below detectable limit |
| 10X | Below detectable limit |
| H—Y | 13 |
| K-L | Below detectable limit |
| Ca-A | Below detectable limit |

As shown in Table 11, the results of the test show that sulfur compounds were removed at a fairly high removal rate over the zeolite with acid sites, i.e., zeolite containing $H^+$ as the cation or dealuminized zeolite, but, trace quantities of hydrogen sulfide evolved. It evolved when tertiary butyl mercaptan was removed by adsorption, by which is meant that hydrogen sulfide comes from tertiary butyl mercaptan.

Then, each sample was press-molded and crushed into pellets, 2.0 to 3.3 mm in size, as was the case with Example 12, and 1.8 g of the sample was filled in a sample tube (inner diameter: 17 mm) as the second adsorbent. The odorant adsorption tests were conducted in a similar manner for the 2-stage system, with USY as the first adsorbent, followed by the second adsorbent, to measure concentration of hydrogen sulfide present in the treated gases. The results are given in Table 12 for the hydrogen sulfide concentration after a lapse of 50 hours.

TABLE 12

| Second adsorbent | Concentration of hydrogen sulfide after a lapse of 50 hours (ppb) |
|---|---|
| USY | 25 |
| H-ZSM-5 | 23 |
| Na—Y | Below detectable limit |
| 10X | Below detectable limit |
| H—Y | 15 |
| K-L | Below detectable limit |
| Ca-A | Below detectable limit |

As shown in Table 12, hydrogen sulfide still evolved after a lapse of 50 hours, when zeolite with acid sites was used as the second adsorbent. On the other hand, evolution of hydrogen sulfide was controlled when zeolite having an alkaline or alkaline-earth metal in the ion-exchanged site was used as the second adsorbent.

Example 14

In order to investigate the effects of simultaneous presence of TBM and DMS, the adsorption tests were conducted under the same conditions as used for Example 2, except that the city gas was replaced by two types of $N_2$ gases, one containing DMS and TBM simultaneously at 2.4 ppm each and the other only TBM at 2.4 ppm, passed over Na—Y, H-Na-ZSM-5 (Si/Al molar ratio: 20, $Na_2O/Al_2O_3$=0.7), H-β and USY. The removal rates after a lapse of 9 hours are given in Table 13.

TABLE 13

| Zeolite | Removal rate (%) after a lapse of 9 hours with the $N_2$ flow containing DMS and TBM simultaneously | | Removal rate (%) after a lapse of 9 hours with the $N_2$ flow containing TBM | Removal rate (%) after a lapse of 9 hours in a flow of city gas containing DMS and TBM simultaneously | |
|---|---|---|---|---|---|
|  | DMS | TBM | TBM | DMS | TBM |
| Na—Y | 100 | 100 | 100 | 0[a] | 25[a] |
| H—Na-ZSM-5 | 85 | 72 | 0 | — | — |
| H-β | 100 | 96 | 0 | 63[a] | 60[a] |
| USY | 72 | 62 | 0 | 45[b] | 57[b] |

[a]From Table 2.
[b]From Table 6.

The removal rate rapidly declined, when the TBM/$N_2$ gas was passed over the zeolite having strongly acid sites, e.g., H-β, H-Na-ZSM-5 (Si/Al molar ratio: 20, $Na_2O/Al_2O_3$=0.7) and USY. On the other hand, it was higher when the $N_2$ gas containing DMS and TBM simultaneously at 2.4 ppm each was passed. On the other hand, no TBM was detected in the gas passed over Na—Y even after a lapse of 9 hours from the start of the test, whether DMS was present or not. It is thus confirmed that TBM breaks through in a relatively short time in the absence of DBM, when passed over zeolite containing $H^+$ as the cation or dealuminized zeolite, but the period before it breaks through will be extended in the presence of DMS.

As described above dimethyl sulfide and tertiary butyl mercaptan present in city gas can be effectively removed for extended periods by the adsorbent and removal method of the present invention.

What is claimed is:

1. A method for removing dimethyl sulfide and tertiary butyl mercaptan from city gas, the method comprising the step of passing city gas comprising dimethyl sulfide and tertiary butyl mercaptan over an adsorbent comprising a zeolite selected from the group consisting of faujasite zeolite, β zeolite, and MFI zeolite, wherein the zeolite comprises an ion-exchangable cation and said ion-exchangable cation is $H^+$.

2. A method for removing dimethyl sulfide and tertiary butyl mercaptan from city gas according to claim 1, wherein said zeolite comprises Si and another type of metal M in the framework, the Si/M atomic ratio is 250 or less, and M is selected from the group consisting of Al, Fe and Ga.

3. A method for removing dimethyl sulfide and tertiary butyl mercaptan from city gas according to claim 2, wherein the Si/M atomic ratio is 50 or less.

4. A method for removing dimethyl sulfide and tertiary butyl mercaptan from city gas, the method comprising the step of passing city gas comprising dimethyl sulfide and tertiary butyl mercaptan over an adsorbent comprising a zeolite that has been treated for dealuminization.

5. A method for removing dimethyl sulfide and tertiary butyl mercaptan from city gas according to claim 1 or claim 4, wherein said adsorbent additionally comprises an inorganic binder.

6. A method for removing dimethyl sulfide and tertiary butyl mercaptan from city gas according to claim 5, wherein said inorganic binder is silica.

7. A method for removing dimethyl sulfide and tertiary butyl mercaptan from city gas according to claim 5, the method additionally comprising the step of heating said adsorbent and regenerating said adsorbent.

8. A method for removing dimethyl sulfide and tertiary butyl mercaptan from city gas according to claim 7, wherein said zeolite comprises Si and another type of metal M in the framework, Si/M atomic ratio being 250 or less, M is selected from the group consisting of Al, Fe and Ga, and said inorganic binder is silica.

9. A method for removing dimethyl sulfide and tertiary butyl mercaptan from city gas according to claim 7, additionally comprising the step of passing gas released from said adsorbent during said heating step over an oxidation catalyst.

10. A method for removing dimethyl sulfide and tertiary butyl mercaptan from city gas according to claim 4, wherein the zeolite is USY zeolite.

11. A method for removing sulfur compounds, the method comprising:

passing city gas comprising dimethyl sulfide and tertiary butyl mercaptan over a first adsorbent comprising ultrastable Y zeolite, and passing the gas from the first step over a second adsorbent comprising MFI zeolite or faujasite zeolite having an alkali metal or an alkaline-earth metal in the cation site.

12. A method for removing sulfur compounds according to claim 11, wherein the second adsorbent is selected from the group consisting of H-ZSM-5 zeolite, Na—Y zeolite, and 10X zeolite.

13. A method for removing dimethyl sulfide and tertiary butyl mercaptan from city gas according to claim 11, wherein the zeolite having the alkali metal or the alkaline-earth metal in the cation site is selected from the group consisting of Na—Y zeolite and 10X zeolite.

14. A method for removing sulfur compounds, the method comprising:

passing city gas comprising a mercaptan over a first adsorbent comprising either a zeolite with $H^+$ as an exchange cation or a dealuminized zeolite; and passing the gas from the first adsorbent over a second adsorbent comprising a zeolite having an alkali metal or an alkaline-earth metal in the ion-exchanged site.

15. A method for removing sulfur compounds according to claim 14, wherein the mercaptan is tertiary butyl mercaptan.

16. A method for regenerating an adsorbent for sulfur compounds, said adsorbent comprising:

(1) a zeolite selected from the group consisting of faujasite zeolite, β zeolite, and MFI zeolite, wherein either the zeolite comprises an ion-exchangable cation and said ion-exchangable cation is $H^+$ or the zeolite has been treated for dealuminization, and (2) an inorganic binder, said method comprising heating said adsorbent after said adsorbent is used for a process which removes dimethyl sulfide and tertiary butyl mercaptan from city gas.

17. A method for regenerating an adsorbent for sulfur compounds according to claim 16, wherein a gas released from said adsorbent during said heating step is oxidized in the presence of an oxidation catalyst.

* * * * *

UNITED STATES PATENT AND TRADEMARK OFFICE
CERTIFICATE OF CORRECTION

PATENT NO.    : 6,579,347 B1
DATED         : June 17, 2003
INVENTOR(S)   : Hidenobu Wakita et al.

It is certified that error appears in the above-identified patent and that said Letters Patent is hereby corrected as shown below:

Title page,
Item [30], should read as follows:
-- [30] Foreign Application Priority Data
Hei10-119,261 (JP) April 28, 1998; Hei10-119,265 (JP) April 28, 1998 --.

Column 10,
Line 35, delete "3/min." and insert -- 31/min. --.

Signed and Sealed this

Twentieth Day of January, 2004

JON W. DUDAS
*Acting Director of the United States Patent and Trademark Office*